United States Patent
Liu et al.

(10) Patent No.: US 8,760,819 B1
(45) Date of Patent: Jun. 24, 2014

(54) MAGNETIC RECORDING SENSOR WITH SPUTTERED ANTIFERROMAGNETIC COUPLING TRILAYER BETWEEN PLATED FERROMAGNETIC SHIELDS

(75) Inventors: Feng Liu, San Ramon, CA (US); Dehua Han, Fremont, CA (US); Ming Sun, Pleasanton, CA (US); Yimin Guo, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 128 days.

(21) Appl. No.: 12/978,145

(22) Filed: Dec. 23, 2010

(51) Int. Cl.
*G11B 5/11* (2006.01)
*G11B 5/33* (2006.01)

(52) U.S. Cl.
USPC .................................................. 360/319

(58) Field of Classification Search
CPC .. G11B 5/1278; G11B 5/3116; G11B 5/3163; G11B 5/3146; G11B 2005/3996; G11B 5/315; G11B 5/11; G11B 5/398; G11B 5/3903; G11B 5/3912
USPC ................... 360/123.12, 123.37, 123.58, 319
See application file for complete search history.

(56) References Cited

U.S. PATENT DOCUMENTS

| | | |
|---|---|---|
| 5,621,592 A | 4/1997 | Gill et al. |
| 5,750,275 A | 5/1998 | Katz et al. |
| 5,804,250 A | 9/1998 | Yang |
| 5,838,521 A | 11/1998 | Ravipati |
| 6,033,491 A | 3/2000 | Lin |
| 6,087,027 A | 7/2000 | Hoshiya et al. |
| 6,129,957 A | 10/2000 | Xiao et al. |
| 6,233,116 B1 | 5/2001 | Chen et al. |
| 6,259,583 B1 | 7/2001 | Fontana, Jr. et al. |
| 6,292,334 B1 | 9/2001 | Koike et al. |
| 6,315,839 B1 | 11/2001 | Pinarbasi et al. |
| 6,322,640 B1 | 11/2001 | Xiao et al. |
| 6,358,635 B1 | 3/2002 | Min et al. |
| 6,373,667 B1 | 4/2002 | Han et al. |
| 6,413,325 B1 | 7/2002 | Shimazawa et al. |
| 6,430,015 B2 | 8/2002 | Ju et al. |
| 6,437,949 B1 | 8/2002 | Macken et al. |
| 6,452,385 B1 | 9/2002 | Shimazawa et al. |
| 6,456,467 B1 | 9/2002 | Mao et al. |
| 6,478,884 B2 | 11/2002 | Shimazawa et al. |
| 6,482,657 B2 | 11/2002 | Shimazawa |
| 6,496,335 B2 | 12/2002 | Gill |
| 6,628,478 B2 | 9/2003 | Gill |
| 6,724,581 B2 | 4/2004 | Westwood |
| 6,754,048 B2 | 6/2004 | Li et al. |
| 6,778,358 B1 | 8/2004 | Jiang et al. |
| 6,791,796 B2 | 9/2004 | Shukh et al. |

(Continued)

FOREIGN PATENT DOCUMENTS

JP          2002298314 A     10/2002

*Primary Examiner* — Brian Miller (57) ABSTRACT

A magnetic recording sensor for use in a data storage device is described. The sensor has a magnetoresistive sensing element and magnetic shields shielding the magnetoresistive sensing element. The magnetic shields include a first plated soft ferromagnetic layer, a second plated soft ferromagnetic layer, and an antiferromagnetic coupling (AFC) trilayer between the first plated soft ferromagnetic layer and the second plated soft ferromagnetic layer. The AFC trilayer includes a first AFC layer of sputtered ferromagnetic material; a second AFC layer of a nonmagnetic antiferromagnetic exchange material, and a third AFC layer of sputtered ferromagnetic material. Shields with AFC trilayers in bottom, side, and/or top shields, and well as between shields are provided. A method of fabricating is also provided.

22 Claims, 5 Drawing Sheets

(56) References Cited

U.S. PATENT DOCUMENTS

| | | | |
|---|---|---|---|
| 6,801,409 B2 | 10/2004 | Michel et al. | |
| 6,818,330 B2 | 11/2004 | Shukh et al. | |
| 6,848,169 B2 | 2/2005 | Shin et al. | |
| 6,876,507 B2 | 4/2005 | Chen et al. | |
| 6,927,952 B2 | 8/2005 | Shimizu et al. | |
| 6,967,823 B2 * | 11/2005 | Nakamoto et al. | 360/319 |
| 6,980,403 B2 | 12/2005 | Hasegawa | |
| 6,998,061 B1 | 2/2006 | Cross | |
| 7,029,771 B2 | 4/2006 | Hasegawa et al. | |
| 7,046,487 B2 | 5/2006 | Terunuma | |
| 7,057,853 B2 | 6/2006 | Okada et al. | |
| 7,158,351 B2 | 1/2007 | Nakamoto et al. | |
| 7,166,173 B2 | 1/2007 | Beach | |
| 7,170,723 B2 | 1/2007 | Taguchi | |
| 7,180,712 B1 | 2/2007 | Li et al. | |
| 7,270,896 B2 | 9/2007 | Parkin | |
| 7,295,401 B2 | 11/2007 | Jayasekara et al. | |
| 7,324,309 B1 * | 1/2008 | Wiesen et al. | 360/319 |
| 7,342,751 B2 | 3/2008 | Nagasaka et al. | |
| 7,382,574 B2 | 6/2008 | Li et al. | |
| 7,426,091 B2 | 9/2008 | Okada et al. | |
| 7,443,639 B2 | 10/2008 | Parkin | |
| 7,446,979 B2 | 11/2008 | Jayasekara | |
| 7,457,080 B2 | 11/2008 | Watabe et al. | |
| 7,551,394 B2 | 6/2009 | Sasaki et al. | |
| 7,554,765 B2 | 6/2009 | Shukh et al. | |
| 7,599,154 B2 | 10/2009 | Sbiaa et al. | |
| 7,606,007 B2 | 10/2009 | Gill | |
| 7,606,010 B2 | 10/2009 | Parkin | |
| 7,652,854 B2 | 1/2010 | Kagami et al. | |
| 7,666,467 B2 | 2/2010 | Parkin | |
| 7,773,341 B2 | 8/2010 | Zhang et al. | |
| 7,807,218 B2 | 10/2010 | Parkin | |
| 7,859,797 B2 | 12/2010 | Hoshino et al. | |
| 7,906,231 B2 | 3/2011 | Parkin | |
| 7,911,737 B1 | 3/2011 | Jiang et al. | |
| 8,049,997 B2 | 11/2011 | Miyauchi et al. | |
| 8,089,734 B2 | 1/2012 | Miyauchi et al. | |
| 8,125,743 B2 | 2/2012 | Ohta et al. | |
| 8,402,635 B2 * | 3/2013 | Degawa et al. | 29/603.14 |
| 8,441,756 B1 | 5/2013 | Sun et al. | |
| 8,451,567 B2 | 5/2013 | Zhou et al. | |
| 8,472,147 B2 | 6/2013 | Singleton et al. | |
| 8,531,801 B1 | 9/2013 | Xiao et al. | |
| 2001/0043446 A1 * | 11/2001 | Barlow et al. | 360/319 |
| 2002/0064002 A1 | 5/2002 | Gill | |
| 2002/0149886 A1 | 10/2002 | Gill | |
| 2004/0120074 A1 | 6/2004 | Okada et al. | |
| 2004/0196681 A1 | 10/2004 | Xiao et al. | |
| 2005/0013044 A1 | 1/2005 | Hirata et al. | |
| 2005/0264948 A1 | 12/2005 | Nakamoto et al. | |
| 2006/0003185 A1 | 1/2006 | Parkin | |
| 2006/0044682 A1 | 3/2006 | Le et al. | |
| 2006/0109592 A1 | 5/2006 | Watanabe et al. | |
| 2006/0119981 A1 | 6/2006 | Li et al. | |
| 2007/0019341 A1 | 1/2007 | Mizuno et al. | |
| 2007/0053114 A1 | 3/2007 | Uesugi et al. | |
| 2007/0111332 A1 | 5/2007 | Zhao et al. | |
| 2007/0195467 A1 | 8/2007 | Gill | |
| 2008/0013221 A1 | 1/2008 | Ohta et al. | |
| 2008/0179699 A1 | 7/2008 | Horng et al. | |
| 2009/0027810 A1 | 1/2009 | Horng et al. | |
| 2009/0052092 A1 | 2/2009 | Zhou et al. | |
| 2009/0128944 A1 | 5/2009 | Jang et al. | |
| 2009/0168240 A1 | 7/2009 | Hsiao et al. | |
| 2009/0174971 A1 * | 7/2009 | Tsuchiya et al. | 360/324.2 |
| 2009/0279213 A1 | 11/2009 | Wu et al. | |
| 2010/0039734 A1 | 2/2010 | Hara et al. | |
| 2010/0079917 A1 | 4/2010 | Miyauchi et al. | |
| 2010/0149689 A1 | 6/2010 | Tsuchiya et al. | |
| 2010/0320076 A1 | 12/2010 | Zhao et al. | |
| 2011/0097601 A1 | 4/2011 | Bai et al. | |
| 2011/0273802 A1 * | 11/2011 | Zhou et al. | 360/319 |
| 2011/0279923 A1 | 11/2011 | Miyauchi et al. | |
| 2011/0317313 A1 | 12/2011 | Miyauchi et al. | |
| 2012/0087045 A1 | 4/2012 | Yanagisawa et al. | |
| 2012/0087046 A1 * | 4/2012 | Yanagisawa et al. | 360/294 |
| 2012/0134057 A1 * | 5/2012 | Song et al. | 360/319 |
| 2012/0147504 A1 | 6/2012 | Zhou et al. | |
| 2012/0250189 A1 | 10/2012 | Degawa et al. | |
| 2012/0281320 A1 | 11/2012 | Singleton et al. | |

* cited by examiner

MAGNETIC RECORDING SENSOR WITH SPUTTERED ANTIFERROMAGNETIC COUPLING TRILAYER BETWEEN PLATED FERROMAGNETIC SHIELDS

BACKGROUND

Figure 1:
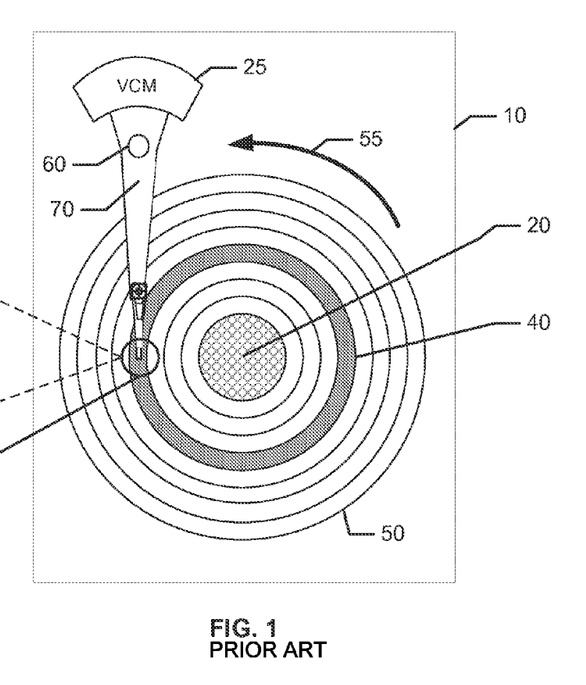
FIG. 1 illustrates a conventional disk drive in a top view.
Figure 1A:
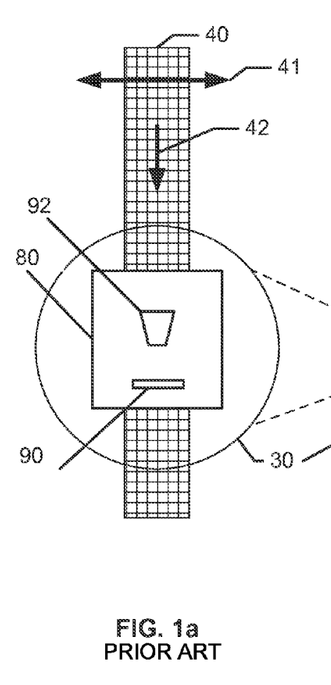
FIG. 1a illustrates a more detailed view of an area shown in FIG. 1.
Figure 1B:
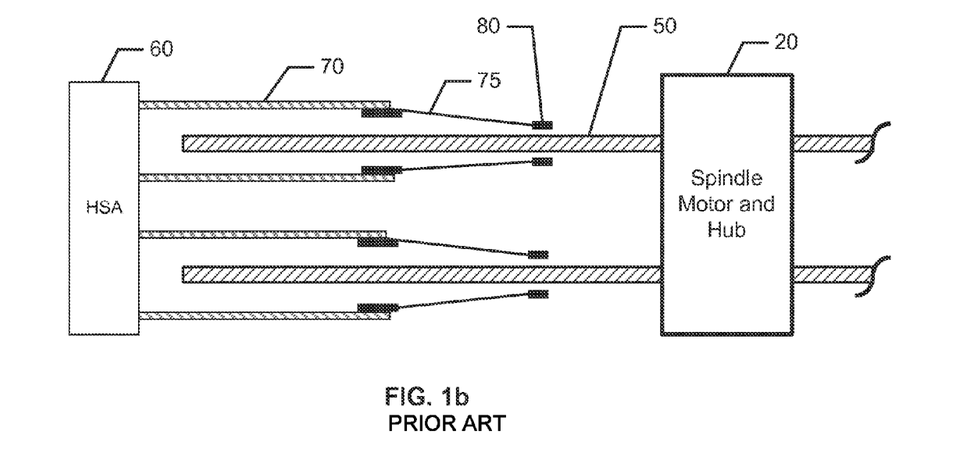
FIG. 1b illustrates side view of the disk drive in FIG. 1.

FIG. 1 illustrates a conventional disk drive 10 used for data storage. FIGS. 1, 1a, and 1b are not drawn to scale and only certain structures are depicted for clarity. Disk media 50 is attached to spindle motor and hub 20. The spindle motor and hub 20 rotate the media 50 in a direction shown by arrow 55. Head Stack assembly (HSA) 60 includes a magnetic recording head 30 on actuator arm 70 and positions actuator arm 70 by positioning the voice coil motor (VCM) 25 over a desired data track, shown as recording track 40 in this example, to write data onto the media 50.

FIG. 1a illustrates an enlarged view of area 30 of FIG. 1. A magnetic sensor 90 is fabricated on slider 80. Slider 80 may be attached to suspension 75 and suspension 75 may be attached to actuator arm 70 as shown in FIG. 1b. Slider 80 may also incorporate a write transducer 92.

Referring again to FIG. 1a, slider 80 is illustrated above recording track 40. Media 50 and track 40 are moving under slider 80 in an in-track direction shown by arrow 42. The cross-track direction is shown by arrow 41.

FIG. 1b illustrates a side view of the disk drive 10 shown in FIG. 1. At least one disk media 50 is mounted onto spindle motor and hub 20. HSA 60 comprises at least one actuator arm 70 that carries suspension 75 and slider 80. Slider 80 has an air bearing surface (ABS) facing media 50. When the media is rotating and actuator arm 70 is positioned over the media 50, slider 80 floats above media 50 by aerodynamic pressure created between the slider ABS and the surface of media 50 facing the ABS of slider 80.

BRIEF SUMMARY

A magnetic recording sensor for use in a data storage device is described. The magnetic recording sensor has a magnetoresistive sensing element and magnetic shields shielding the magnetoresistive sensing element. The magnetic shields include a first plated soft ferromagnetic layer, a second plated soft ferromagnetic layer, and an antiferromagnetic coupling (AFC) trilayer between the first plated soft ferromagnetic layer and the second plated soft ferromagnetic layer. The AFC trilayer includes a first AFC layer of sputtered ferromagnetic material; a second AFC layer of a nonmagnetic antiferromagnetic exchange material, and a third AFC layer of sputtered ferromagnetic material. Shields with AFC trilayers in bottom, side, and/or top shields, and well as between shields are provided. A method of fabricating is also provided.

The magnetic recording sensor for use in a data storage device has a read sensor stack having a read sensor and a first end opposing a second end. The magnetic shield may include a first soft ferromagnetic layer, a second soft ferromagnetic layer, and an antiferromagnetic coupling (AFC) trilayer between the first soft ferromagnetic layer and the second soft ferromagnetic layer. The AFC trilayer may include a first AFC layer comprising ferromagnetic material, a second AFC layer comprising a nonmagnetic antiferromagnetic exchange material, and a third AFC layer comprising ferromagnetic material. The second soft ferromagnetic layer may surround a portion of the first and second ends of the read sensor stack. The AFC trilayer may surround a portion of the first and second ends of the read sensor stack. The read sensor stack may be separated from the first and second soft ferromagnetic layers by a nonmagnetic gap. The AFC trilayer may surround the read sensor of the read sensor stack along the first and second ends of the read sensor stack.

The read sensor stack may also include a third end opposing a fourth end. The magnetic recording sensor may further include a second AFC trilayer and a bottom shield disposed on the side of the fourth end of the read sensor stack. The magnetic shield may include a third soft ferromagnetic layer. The second AFC trilayer location may be at least one of: between the first and third soft ferromagnetic layers of the magnetic shield or within the bottom shield.

A disk drive is described. The disk drive has a slider including a magnetic sensor. The magnetic sensor includes a read sensor stack. The read sensor stack may include a read sensor and a first end opposing a second end. The magnetic sensor may include at least one magnetic shield. The at least one magnetic shield may include a first soft ferromagnetic layer, a AFC trilayer, and a second soft ferromagnetic layer. The second soft ferromagnetic layer may surround a portion of the first and second ends of the read sensor stack. The AFC trilayer may surround a portion of the first and second ends of the read sensor stack. The read sensor stack may be separated from the first and second soft ferromagnetic layers by a nonmagnetic gap. The AFC trilayer may surround the read sensor of the read sensor stack along the first and second ends of the read sensor stack.

DETAILED DESCRIPTION OF THE EMBODIMENTS

Figure 2:
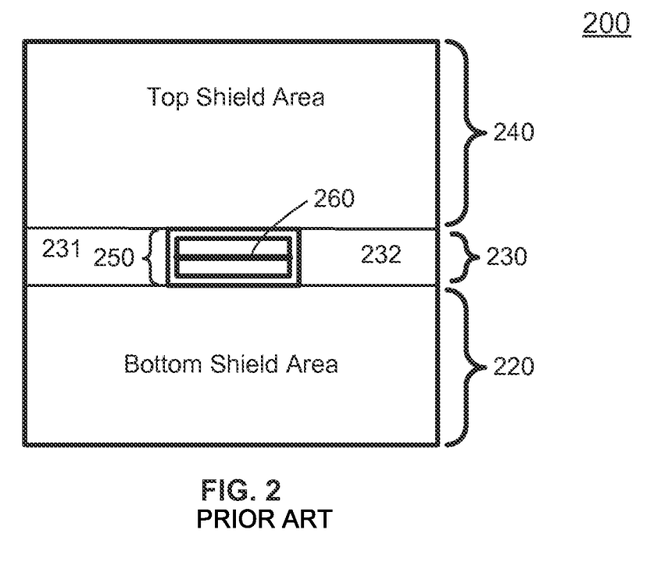
FIG. 2 illustrates a magnetoresistive sensor and shield areas.

FIG. 2 illustrates an ABS view of magnetic sensor 200 that is on slider 80 as shown in FIG. 1a. The ABS view is the view looking at the ABS from the viewpoint of the media surface. Magnetic sensor 200 comprises sensor stack 250, magnetoresistive read sensor 260 within sensor stack 250, bottom shield area 220, side shield area 230 including side shield areas 231 and 232, and top shield area 240.

Sensor stack 250 may comprise many layers including, for example: bias layers, pinning layers, coupling layers, and various process layers such as seed layers and capping layers. Magnetoresistive read sensor 260 may also comprise multiple layers. The structure of sensor stack 250 and magnetoresistive sensor 260 are provided for reference only, and embodiments of the invention will work with any type of magnetoresistive read sensor including, for example, Giant Magnetoresistive (GMR), Tunneling Magnetoresistive (TMR), and variations including Current Perpendicular to Plane (CPP) and Current In Plane (CIP) sensing structures.

Figure 3:
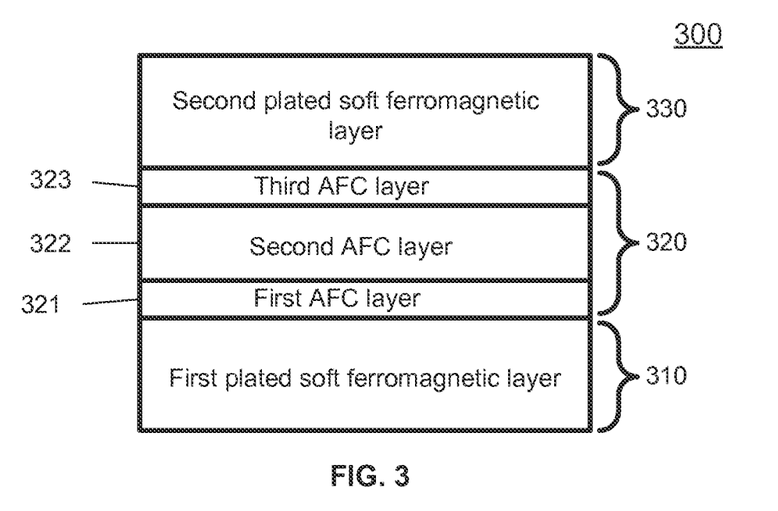
FIG. 3 illustrates an embodiment of the invention with plated ferromagnetic layers separated by an AFC trilayer.

FIG. 3 illustrates shield 300 in an embodiment of the invention. Shield 300 comprises plated soft ferromagnetic layers 310 and 330 separated by AFC trilayer 320. AFC trilayer 320 comprises first sputtered AFC layer 321 formed on and in contact with first plated soft ferromagnetic layer 310. Second sputtered AFC layer 322 is formed on and in contact with first sputtered AFC layer 321, and third sputtered AFC layer 323 formed on and in contact with second sputtered AFC layer 322. Second plated soft ferromagnetic layer 330 is formed on and in contact with third sputtered AFC layer 323.

Figure 4:
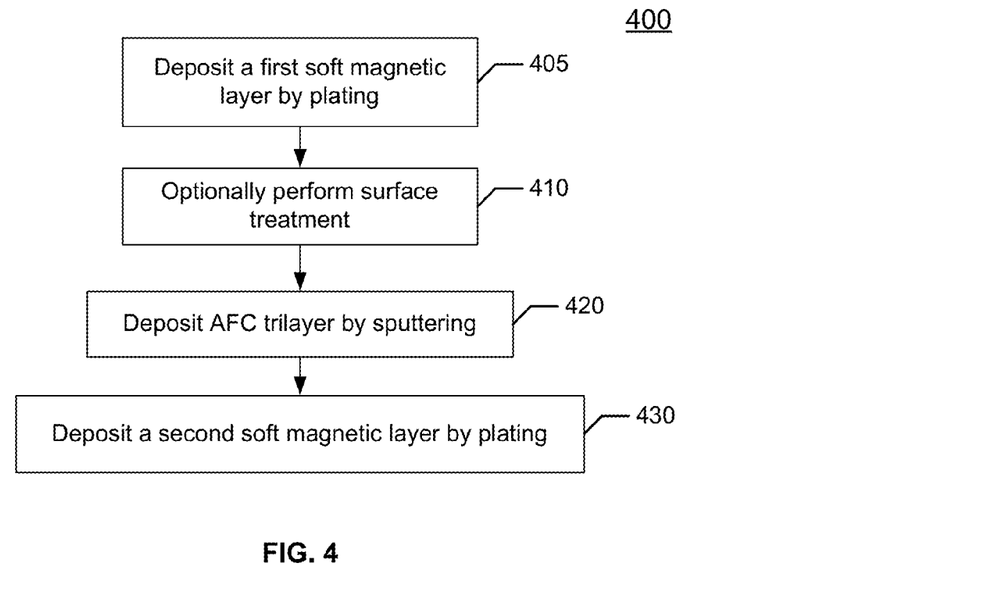
FIG. 4 is a flow chart illustrating fabrication steps for a magnetic shield with an AFC trilayer according to an embodiment of the invention.

FIG. 4 is a flow chart illustrating process 400 for fabrication of a magnetic shield with an AFC trilayer according to an embodiment of the invention. Beginning in block 405, a first soft ferromagnetic material is formed by plating. The surface of first soft ferromagnetic layer 400 may optionally be treated in block 410 to provide a desired roughness or texture. Surface treatment may be, for example, by milling. After plating the first soft ferromagnetic layer and optionally treating the surface, an AFC trilayer is sputtered on and in contact with the first soft ferromagnetic surface in block 420. After depositing the AFC trilayer in block 420, a second soft ferromagnetic layer is deposited on and in contact with the AFC trilayer by plating in block 430.

Figure 5:
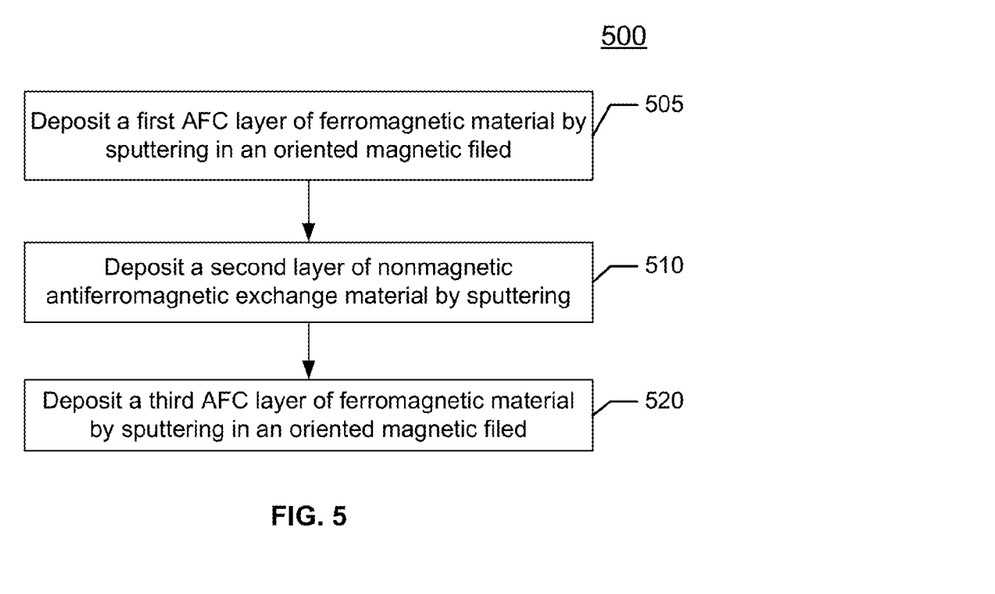
FIG. 5 is a flow chart illustrating fabrication steps for a trilayer according to an embodiment of the invention.

FIG. 5 is a flow chart illustrating fabrication of a trilayer according to an embodiment of the invention. Process 500 may be used for depositing an AFC trilayer as shown in FIG. 4, block 420. As described in process 400, a first soft ferromagnetic layer is plated and the surface is optionally treated in block 410. Beginning in block 505 of FIG. 5, a first AFC layer of ferromagnetic material is sputtered on and in contact with a plated soft ferromagnetic layer. In block 510, a second AFC layer of nonmagnetic antiferromagnetic exchange material is deposited on and in contact with first AFC layer by sputtering. In step 520, a third AFC layer of ferromagnetic is deposited on and in contact with second AFC layer by sputtering. After the third AFC layer is deposited, the AFC trilayer is complete; and a second soft ferromagnetic layer is deposited by plating as described in FIG. 4, block 430.

In an embodiment of the invention, the sputtering described process 500 blocks 505 may be in a magnetic field oriented in the same plane as the ABS. In another embodiment of the invention, the magnetic field may optionally be further oriented in a cross-track direction.

In an embodiment of the invention, the nonmagnetic antiferromagnetic exchange material described in FIG. 3 second AFC layer 322 and FIG. 5 block 510 comprises at least one of Ru, Cr, Os, Ir, Re, Rh, Nb, Ta, Ti, Zr, Hf, Mo, or W; where Ru is ruthenium, Cr is chromium, Os is osmium, Ir is iridium, Re is rhenium, Rh is rhodium, Nb is niobium, Ta is tantalum, Ti is titanium, Zr is zirconium, Hf is hafnium, Mo is molybdenum, and W is tungsten.

In an embodiment of the invention, the plated soft ferromagnetic layers described in FIG. 3, first soft ferromagnetic layer 310 and second soft ferromagnetic layer 330 comprises ferromagnetic material with coercivity less than 100 Oersteds (Oe). In further embodiments of the invention, the ferromagnetic material may comprise at least one of cobalt (Co), nickel (Ni), and iron (Fe). In yet another embodiment of the invention the ferromagnetic material may comprise Ni80Fe20 or Ni45Fe55.

In another embodiment of the invention, the nonmagnetic antiferromagnetic exchange material 322 in shield 300 of FIG. 3, and further described in FIG. 5 block 510, the thickness of the nonmagnetic antiferromagnetic exchange material layer is one of:
between approximately 0.31 nm and 0.39 nm;
between approximately 0.69 nm and 0.105 nm, and
between approximately 1.52 nm and 1.69 nm.

In yet another embodiment of the invention, the thickness of the trilayer 320 shown in FIG. 3, also described in block 420 in FIG. 4, is between 1 nm and 100 nm; and the thickness of the plated soft ferromagnetic layers shown in layers 310 and 330 of FIG. 3, and also described in blocks 400 and 430 of FIG. 4, is greater than 200 nm.

In other embodiments of the invention, AFC trilayer 320 is sputtered at a temperature between 20° C. and 50° C. and not annealed after sputtering. In an alternative embodiment, AFC trilayer 320 is sputtered at a temperature between 20° C. and 50° C. and subsequently annealed in the presence of a magnetic field oriented in the same plane as an air bearing surface of the magnetic recording transducer and optionally further oriented in a cross track direction.

In the foregoing embodiments, pinning layers may be absent from the trilayers and the soft ferromagnetic layers adjacent to the trilayers.

Figure 6:
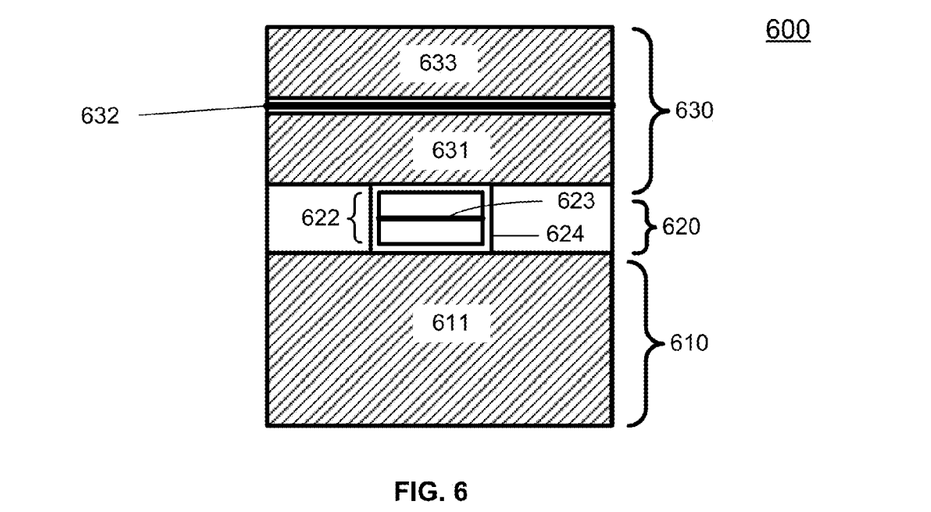
FIG. 6 illustrates an embodiment of the invention with an AFC trilayer in a top shield.

FIG. 6 illustrates an embodiment of the invention comprising a bottom shield 610, a side area 620, and a magnetic recording sensor 600 with an AFC trilayer 632 in a top shield 630. Read sensor stack 622, having a read sensor 623, is formed above first plated soft ferromagnetic layer 611, and separated from the first plated soft ferromagnetic layer 611 by nonmagnetic gap 624. The side areas of the sensor stack 622 may be magnetic or nonmagnetic material. In an embodiment, nonmagnetic gap 624 may be a thin layer of carbon, diamond like carbon (DLC), amorphous silicon, or alumina. Second layer 631 of soft ferromagnetic material is plated over the sensor stack 622. AFC trilayer 632 is formed on and in contact with second soft ferromagnetic layer 631 in the same manner shield 300 in FIG. 3 and described in process 500 blocks 505-520 of FIG. 5. Third layer 633 of soft ferromagnetic material is plated on and in contact with trilayer 632.

Figure 7:
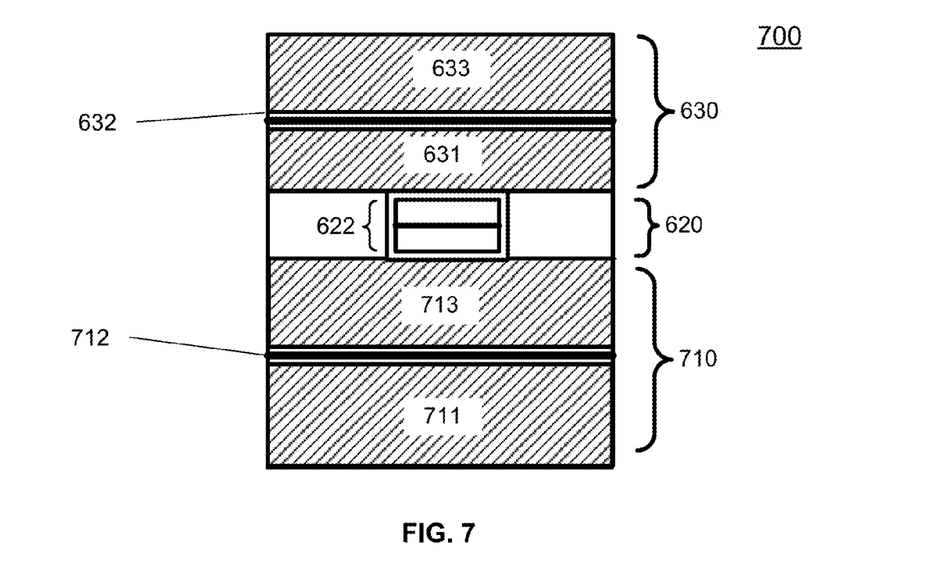
FIG. 7 illustrates an embodiment of the invention with AFC trilayers in the bottom shield area and top shield area.

FIG. 7 illustrates an embodiment of the invention comprising a magnetic recording sensor 700 with AFC trilayer 712 in bottom shield 710 and AFC trilayer 632 in top shield 630. Plated first soft ferromagnetic layer 711 is provided, and AFC trilayer 712 may be formed above and in contact with plated first soft ferromagnetic layer 711 in the same manner shown in process 300 in FIG. 3 and described in process 500 blocks 505-520 of FIG. 5. Second plated soft ferromagnetic layer 713 is plated above and in contact with first AFC trilayer 712. Read sensor stack 622 is formed above second soft ferromagnetic layer 713; and top shield 630 comprising plated soft ferromagnetic layer 631, AFC trilayer 632, and plated soft ferromagnetic layer 633 may be formed above read sensor stack 622 as described in process 500 blocks 505-520 of FIG. 5 and magnetic recording sensor 600 shown in FIG. 6.

Figure 8:
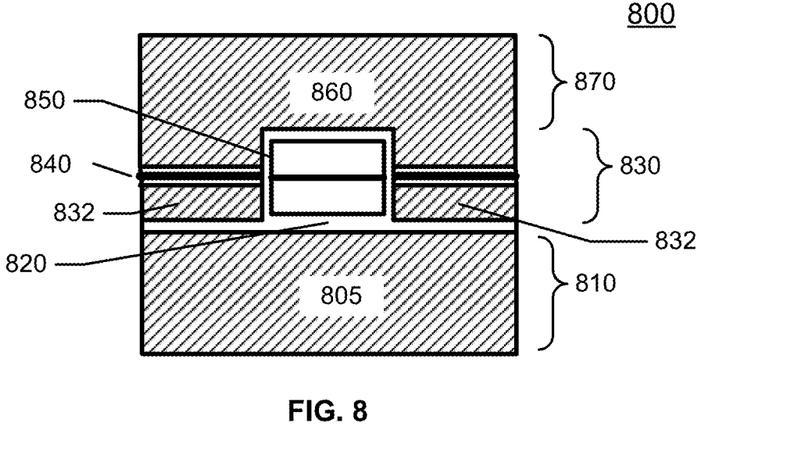
FIG. 8 illustrates an embodiment of the invention with an AFC trilayer in a side shield area.

FIG. 8 illustrates an embodiment of the invention comprising magnetic recording sensor 800 with an AFC trilayer 840 in a side shield area 830. In the magnetic recording sensor 800, the side shield area has soft ferromagnetic material surrounding the read sensor stack 850. Read sensor stack 850 is separated from the surrounding soft ferromagnetic material by nonmagnetic gap 820. Nonmagnetic gap 820 also separates the bottom shield area 810 from the side shield area 830 and acts as an insulator between layer 805 and side layers 832.

AFC trilayer 840 may be positioned anywhere in side shield 830; between bottom shield 810 and side shields 832, or between top shield 870 and side shields 832. First plated soft ferromagnetic layer 805 forms a bottom shield. Side shields 832, AFC trilayer 840 and second plated soft ferromagnetic layer 860 forms a wrap around shield for read sensor stack 850.

Figure 9:
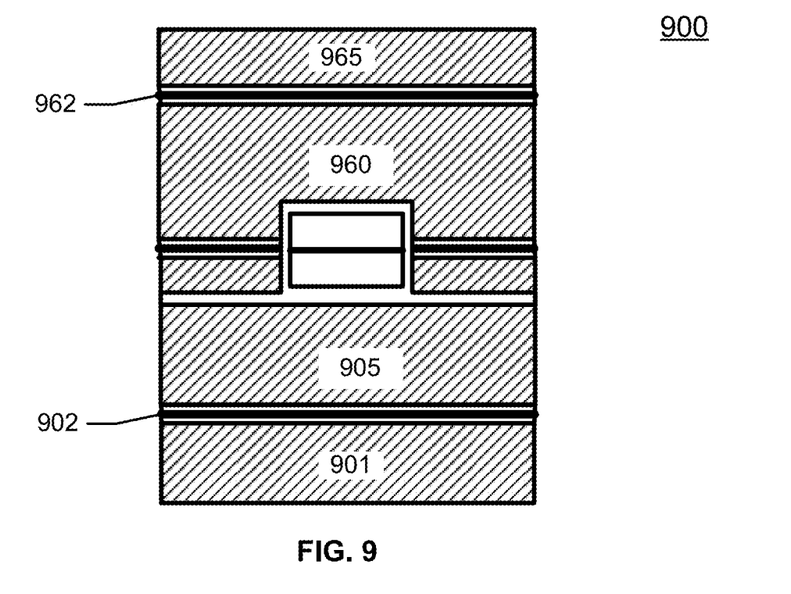
FIG. 9 illustrates and embodiment of the invention with multiple AFC trilayers.

FIG. 9 illustrates an embodiment of the invention comprising magnetic recording sensor 900. Magnetic Sensor 900 is similar to magnetic sensor 800 in FIG. 8; however, adds trilayer 902 in the bottom shield and trilayer 962 in the top shield. The trilayers 902 and 962 may be formed in the same manner as in magnetic sensor 700 shown in FIG. 7 and accompanying description.

More than one AFC trilayer can be incorporated into shields of a recording sensor. For example, magnetic recording sensor 700 has AFC trilayers in the bottom and top shields, whereas magnetic recording sensor 800 has an AFC trilayer in the side shield. It can readily be seen that both embodiments can be combined into a magnetic read sensor with AFC trilayers in bottom, side, and top shields.

Magnetic shields are used in magnetic transducers for various reasons. In some embodiments, magnetic shields function by providing an attractive path for magnetic flux where it may be harmlessly dissipated, for example, in soft ferromagnetic material.

In one application using magnetic shielding, a magnetic writer pole may be shielded to control direction of magnetic write flux and prevent unwanted magnetic flux emanating in an undesirable direction. In a disk drive recording transducer, shields may prevent a writer from overwriting or degrading adjacent areas, or possibly erasing data. In another disk drive example, a magnetoresistive read sensor senses magnetic flux from a written medium, and reader shields can prevent a unwanted flux from nearby areas on the head or the medium from being sensed by the sensor, thereby improving signal to noise ratio.

Magnetic shields themselves can become noise sources in highly sensitive environments. Shields may become saturated and lose effectiveness, or they may have magnetic domains that change magnetic orientation in an undesirable manner. Such domain switching can induce noise into a read or write transducer, for example.

Some embodiments of the present invention provide magnetic shields that improve magnetic shielding and/or reduce undesirable effects from shields. Embodiments of the invention using an AFC trilayer may improve the shield performance by reducing noise from magnetic domain switching within the shields. In some embodiments, the use of multiple AFC trilayers may further reduce shield disorder. The use of sputtered ferromagnetic material and plated soft ferromagnetic layers provides improved ferromagnetic order and performance with lower noise.

Although the foregoing has been described in terms of certain embodiments, other embodiments will be apparent to those of ordinary skill in the art from the disclosure herein. For example, in an alternative embodiment, multiple AFC trilayers may be incorporated in bottom, side, or top shield areas, or may be omitted from any of the bottom, side or top shield areas. In other alternative embodiments, shields may be tilted, angled, or irregular in shape, while incorporating the AFC trilayers in a similar manner. The described embodiments have been presented by way of example only and are not intended to limit the scope of the disclosure. Indeed, the novel methods and systems described herein may be embodied in a variety of other forms without departing from the spirit thereof. Thus, the invention is not limited by any preferred embodiments, but is defined by reference to the appended claims.

We claim:

1. A magnetic recording sensor for use in a data storage device, comprising:
   a read sensor stack comprising:
      a read sensor;
      a first end opposing a second end; and
      a third end opposing a fourth end;
   a magnetic shield comprising a first soft ferromagnetic layer, a second soft ferromagnetic layer, a third soft ferromagnetic layer, and a first antiferromagnetic coupling (AFC) trilayer between the first soft ferromagnetic layer and the second soft ferromagnetic layer, wherein the first AFC trilayer comprises:
      a first AFC layer comprising ferromagnetic material;
      a second AFC layer comprising a nonmagnetic antiferromagnetic exchange material; and
      a third AFC layer comprising ferromagnetic material;
   a second AFC trilayer; and
   a bottom shield disposed on the side of the fourth end of the read sensor stack, wherein the second AFC trilayer location is at least one of:
      between the first and third soft ferromagnetic layers of the magnetic shield; or within the bottom shield;
   wherein the second soft ferromagnetic layer surrounds a portion of the first and second ends of the read sensor stack,
   wherein the first AFC trilayer surrounds a portion of the first and second ends of the read sensor stack; and
   wherein the read sensor stack is separated from the first and second soft ferromagnetic layers by a nonmagnetic gap.

2. The magnetic recording sensor in claim 1, wherein:
   the first AFC layer and third AFC layer are not pinned by a pinning layer.

3. The magnetic recording sensor in claim 1, wherein:
   the first AFC trilayer is in contact with the first and the second soft ferromagnetic layers.

4. The magnetic recording sensor in claim 1, wherein:
   the first and third AFC layers are sputtered in the presence of a magnetic field oriented in the same plane as an air bearing surface of the magnetic recording sensor.

5. The magnetic recording sensor in claim 4, wherein:
   the magnetic field is oriented in a cross track direction.

6. The magnetic recording sensor in claim 1, wherein:
   the nonmagnetic antiferromagnetic exchange material comprises at least one of Ru, Cr, Os, Ir, Re, Rh, Nb, Ta, Ti, Zr, Hf, Mo, or W.

7. The magnetic recording sensor in claim 1:
   the soft ferromagnetic layers comprise ferromagnetic material with coercivity less than 100 Oe.

8. The magnetic recording sensor in claim 1, wherein:
   at least one of the AFC layers of the first AFC trilayer comprises at least one of Co, Ni, and Fe.

9. The magnetic recording sensor in claim 1, wherein:
   at least one of the soft ferromagnetic layers comprises Ni100Fe20 or Ni45Fe55.

10. The magnetic recording sensor in claim 1, wherein:
    the thickness of the nonmagnetic antiferromagnetic exchange material layer is one of:
    between approximately 0.31 nm and 0.39 nm;
    between approximately 0.69 nm and 0.105 nm, and
    between approximately 1.52 nm and 1.69 nm.

11. The magnetic recording sensor in claim 1, wherein:
    the thickness of the trilayer is between 1 nm and 100 nm, and
    the thickness of the plated soft ferromagnetic layers is greater than 200 nm.

12. The magnetic recording sensor in claim 1, wherein:
the first AFC trilayer is sputtered at a temperature between 20° C. and 50° C. and not annealed after sputtering.

13. The magnetic recording sensor in claim 1, wherein:
the first AFC trilayer is sputtered at a temperature between 20° C. and 50° C. and subsequently annealed in the presence of a magnetic field oriented in the same plane as an air bearing surface of the magnetic recording sensor, and further oriented in a cross track direction.

14. The magnetic recording sensor in claim 1, wherein:
the second AFC trilayer location is between the first and third soft ferromagnetic layers of the magnetic shield.

15. The magnetic recording sensor in claim 1:
further comprising a third AFC trilayer,
wherein the third AFC trilayer location is within the bottom shield.

16. The magnetic recording sensor in claim 1, wherein:
the first soft ferromagnetic layer surrounds the third end of the read sensor stack and a portion of the first and second ends of the read sensor stack.

17. The magnetic recording sensor of claim 1,
wherein the first AFC trilayer surrounds the read sensor of the read sensor stack along the first and second ends of the read sensor stack.

18. A disk drive comprising:
a slider including a magnetic sensor, the magnetic sensor including:
  a read sensor stack comprising:
    a read sensor;
    a first end opposing a second end; and
    a third end opposing a fourth end;
  a magnetic shield, the magnetic shield further comprising:
    a first soft ferromagnetic layer;
    a first AFC trilayer;
    a second soft ferromagnetic layer; and
    a third soft ferromagnetic layer;
  a second AFC trilayer; and
  a bottom shield disposed on the side of the fourth end of the read sensor stack wherein the second AFC trilayer location is at least one of:
    between the first and third soft ferromagnetic layers of the magnetic shield; or within the bottom shield;
wherein the second soft ferromagnetic layer surrounds a portion of the first and second ends of the read sensor stack,
wherein the first AFC trilayer surrounds a portion of the first and second ends of the read sensor stack, and
wherein the read sensor stack is separated from the first and second soft ferromagnetic layers by a nonmagnetic gap.

19. The disk drive of claim 18 wherein the first AFC trilayer further comprises:
a first AFC layer of ferromagnetic material;
a second AFC layer of nonmagnetic antiferromagnetic exchange material, and
a third AFC layer of ferromagnetic material.

20. The disk drive in claim 18, wherein:
the first AFC trilayer is not pinned by a pinning layer.

21. The disk drive of claim 18, wherein:
the first soft ferromagnetic layer surrounds the third end of the read sensor stack and a portion of the first and second ends of the read sensor stack.

22. The disk drive of claim 18,
wherein the first AFC trilayer surrounds the read sensor of the read sensor stack along the first and second ends of the read sensor stack.

* * * * *